US008073237B2

(12) United States Patent
Mestha et al.

(10) Patent No.: US 8,073,237 B2
(45) Date of Patent: Dec. 6, 2011

(54) JOB INTEGRITY SENSING WITH CLEAR TONER, OUTPUT MANAGEMENT AND CONTROL SYSTEM

(75) Inventors: Lalit Keshav Mestha, Fairport, NY (US); Peter Stanley Fisher, Pasadena, CA (US)

(73) Assignee: Xerox Corporation, Norwalk, CT (US)

( * ) Notice: Subject to any disclaimer, the term of this patent is extended or adjusted under 35 U.S.C. 154(b) by 845 days.

(21) Appl. No.: 12/127,690

(22) Filed: May 27, 2008

(65) Prior Publication Data

US 2009/0296993 A1 Dec. 3, 2009

(51) Int. Cl.
*G06K 9/00* (2006.01)

(52) U.S. Cl. ........................................ 382/141; 382/152

(58) Field of Classification Search .......... 356/100–154, 356/181–231
See application file for complete search history.

(56) References Cited

U.S. PATENT DOCUMENTS

| | | | | |
|---|---|---|---|---|
| 3,676,646 | A | 7/1972 | Carlsen et al. | |
| 4,869,532 | A * | 9/1989 | Abe et al. | 283/88 |
| 4,970,554 | A * | 11/1990 | Rourke | 399/84 |
| 5,429,468 | A * | 7/1995 | Kojima | 412/19 |
| 6,039,257 | A * | 3/2000 | Berson et al. | 235/468 |
| 6,075,888 | A * | 6/2000 | Schwartz | 382/167 |
| 6,206,358 | B1 * | 3/2001 | Yamaguchi et al. | 270/52.02 |
| 6,762,858 | B2 * | 7/2004 | Haro | 358/1.9 |
| 6,775,381 | B1 * | 8/2004 | Nelson et al. | 380/54 |
| 7,413,175 | B2 * | 8/2008 | Levine et al. | 270/58.08 |
| 2003/0189612 | A1 * | 10/2003 | Darby et al. | 347/19 |
| 2007/0145735 | A1 * | 6/2007 | Lawandy et al. | 283/72 |
| 2009/0040563 | A1 | 2/2009 | Mestha et al. | |

* cited by examiner

*Primary Examiner* — Gregory J Toatley
*Assistant Examiner* — Jarreas C Underwood
(74) *Attorney, Agent, or Firm* — Fay Sharpe LLP

(57) ABSTRACT

The present exemplary embodiment relates to a job integrity and verification system which uses patches comprised of at least one symbology printed in non-visible ink and attached to the individual components of a job. The patches are detected, read, and interpreted by use of an inline spectrophotometer. The content of the plurality of patches are compared and when a match is detected, the components containing the patches are combined together into one end item finished product.

17 Claims, 7 Drawing Sheets

600

610 620

| PATCH# | AREA COVERAGE |
|---|---|
| 1 | NO TONER (PAPER WHITE) |
| 2 | 100% |
| 3 | 75% |
| 4 | 60% |
| 5 | 45% |
| 6 | 30% |
| 7 | 15% |

FIG. 6

JOB INTEGRITY SENSING WITH CLEAR TONER, OUTPUT MANAGEMENT AND CONTROL SYSTEM

BACKGROUND

The present exemplary embodiment relates to a job integrity and verification system. It finds particular application in conjunction within printing, and will be described with particular reference thereto. However, it is to be appreciated that the present exemplary embodiment is amendable to other like applications.

BRIEF DESCRIPTION

We propose a system, method, and apparatus to improve operational efficiency and reliability, job integrity management functions performed in document production shops. Sensing solutions play an important role in automating the job integrity functions. Our proposed solution incorporates a sensing solution which uses an inline spectrophotometer to read an invisible symbology placed on the cover of the book or specially designated job integrity sheet in order to enable customers to track printing jobs. We proposed to print coded information using invisible yellow patches. The present application offers a spectrophotometric solution for job integrity and output management applications with symbology printed using clear toner.

BRIEF DESCRIPTION OF THE DRAWINGS

FIG. 6 is a table correlating patch size to page surface area coverage; and

DETAILED DESCRIPTION

Figure 1:
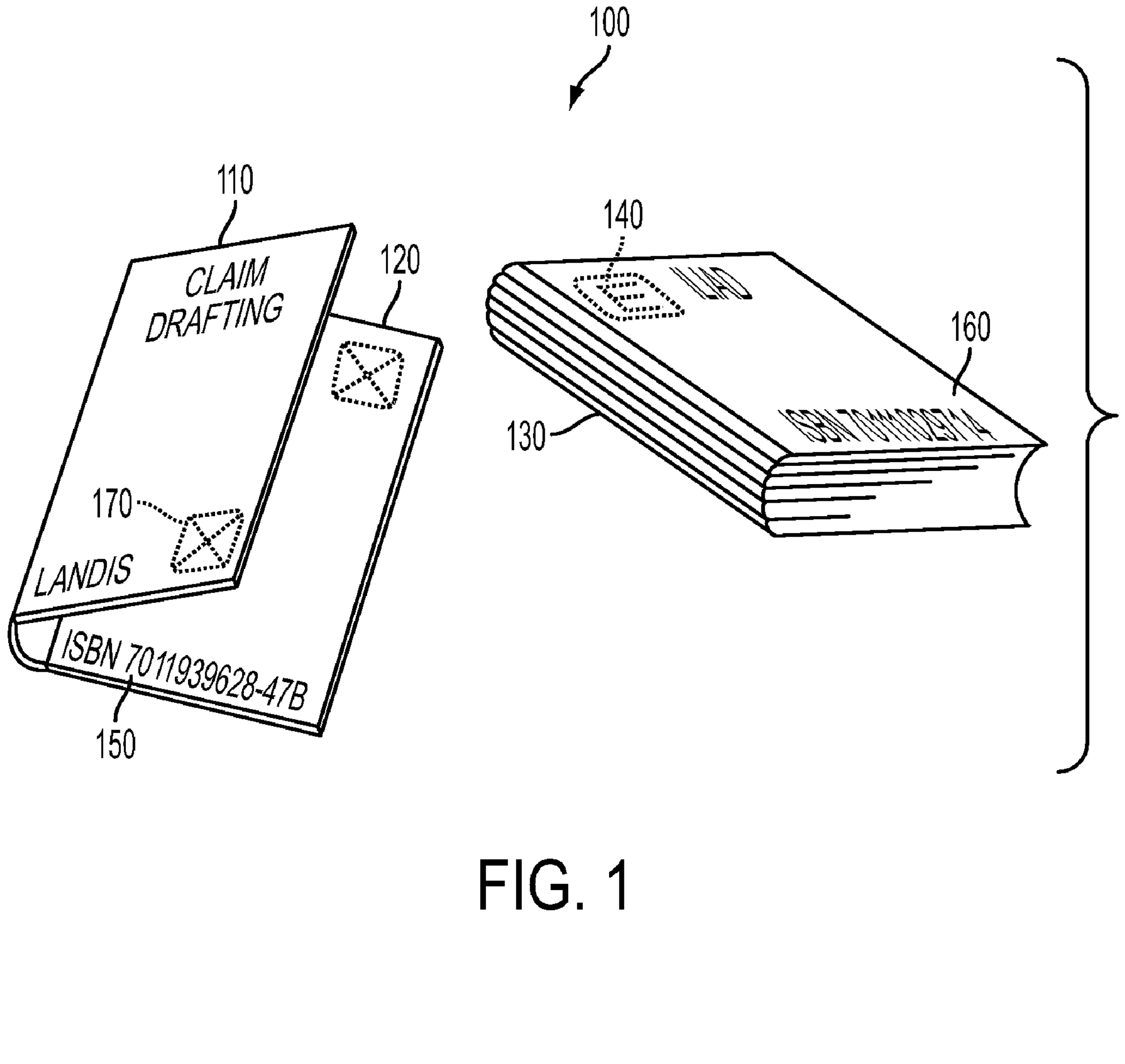
FIG. 1 is an illustration of a cover and bound pages that do not match and include visible marks.

With reference to FIG. 1, the present application illustrates one embodiment incorporating book binding 100. Here a book cover 110 has not yet been attached or bound to any pages. A patch may be placed inside 120 or outside 170 the cover which is not yet attached to a book 110. A cover page and attached unbound pages 130 would also contain a patch 140. Often in publishing, the unattached cover and the unbound pages are incorrectly mated such that the title of the cover does not match the title of the unbound pages. A patch attached to both the cover and the pages could prevent this mismatch by allowing a means to check if the cover patch 120 and the pages patch 140 match first before the binding takes place. If the two patches were indicated to be different, the erroneous binding could be prevented. Currently in the art, a visible mark is used to perform this matching by placing the same number on the inside of the cover 150 and the pages 160. This type of mark is visible and obtrusive to the reader who is interested in the content and may be distracted by what the reader feels is an extraneous marking on the book.

Figure 2:
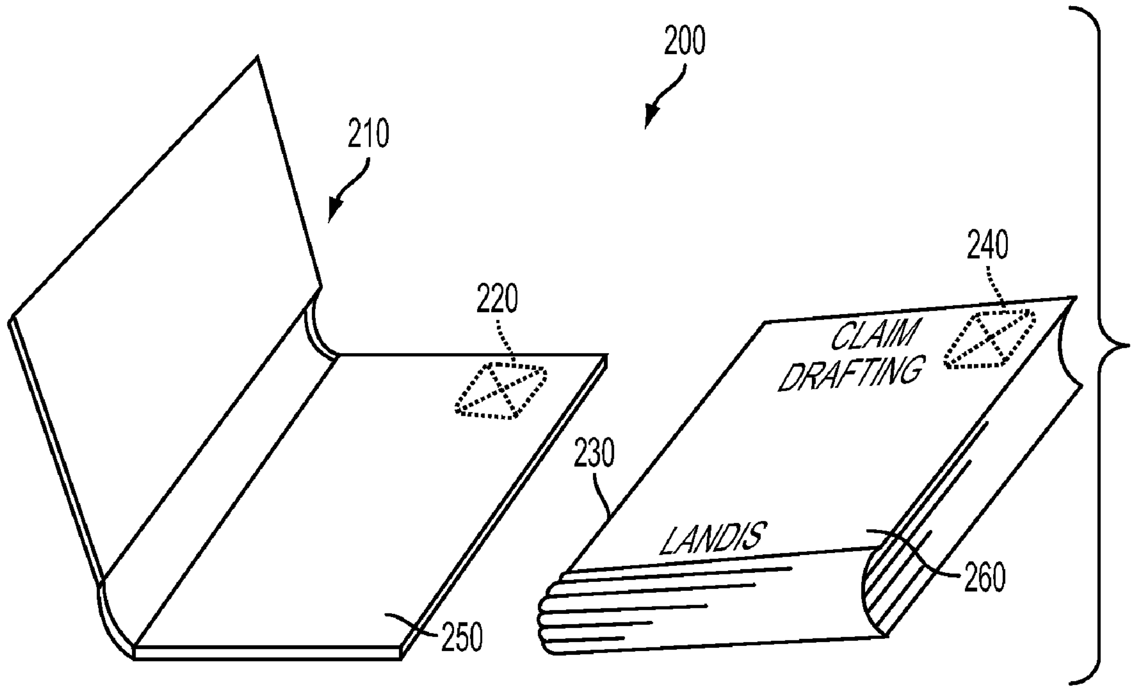
FIG. 2 is an illustration of a cover and bound pages that do match and that no longer have visible marks.

With reference to FIG. 2, the present application illustrates a match between patches 200. The unbound cover 210 contains a patch 220 which can be compared to the cover page attached to the unbound pages 230 and the patch thereon 240. When the patch on the cover 220 and the patch on the pages 240 match, the proper binding of the cover 210 and the pages 230 can be performed. As such, the visible mark that was necessary prior to using patches before on the cover 150 is no longer present on the cover 250, and the visible mark that was visible on the title page attached to the unbound pages 160 is no longer visible on the pages 260.

Such a system improves the operational efficiency and reliability, job integrity management functions are included in the document production shops. Sensing solutions play an important role in automating the job integrity functions.

Figure 3:
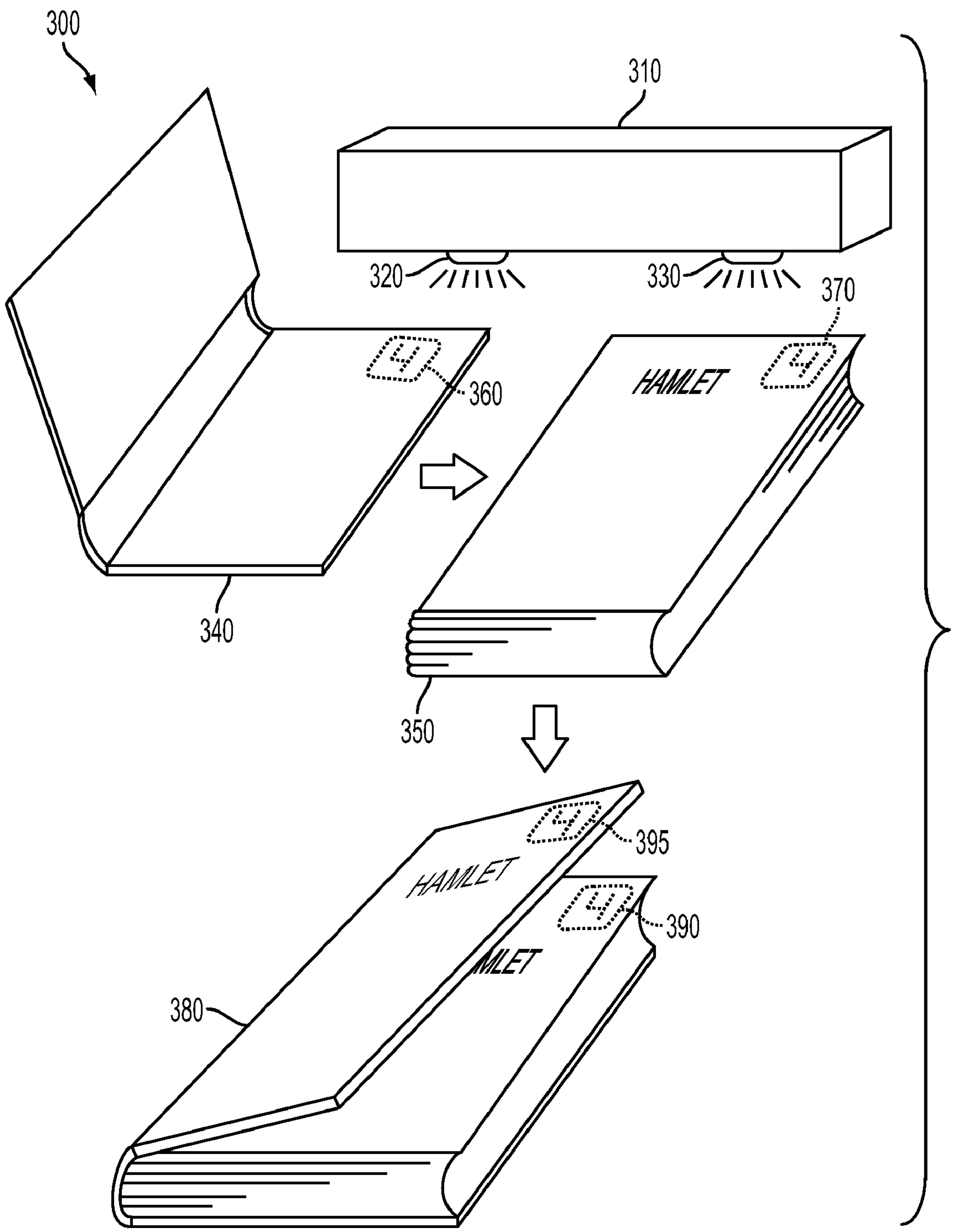
FIG. 3 is an illustration of the spectrophotometer scanning the cover and pages that match symbologies and results in the completed binding of the matching cover and pages.

With reference to FIG. 3, the present application illustrates an embodiment of the present application 300. This incorporates at least one inline spectrophotometer 310 which may contain a plurality of lenses such that one lens 320 reads the cover 340 and another lens 330 reads the cover page attached to the unbound pages 350. This solution uses an invisible patch 360 on the cover of the book 340 and another patch 370 on the cover page unbound pages 350. The device may also incorporate a specially designated job integrity sheet such that customers may indicate what they wish to track. Upon matching the patch on the cover 360 with the patch on the cover page attached to the unbound pages 370, the pages may be bound into the cover 380, such that the patch on the bound pages 390 corresponds to the patch on the cover 395.

Figure 4:
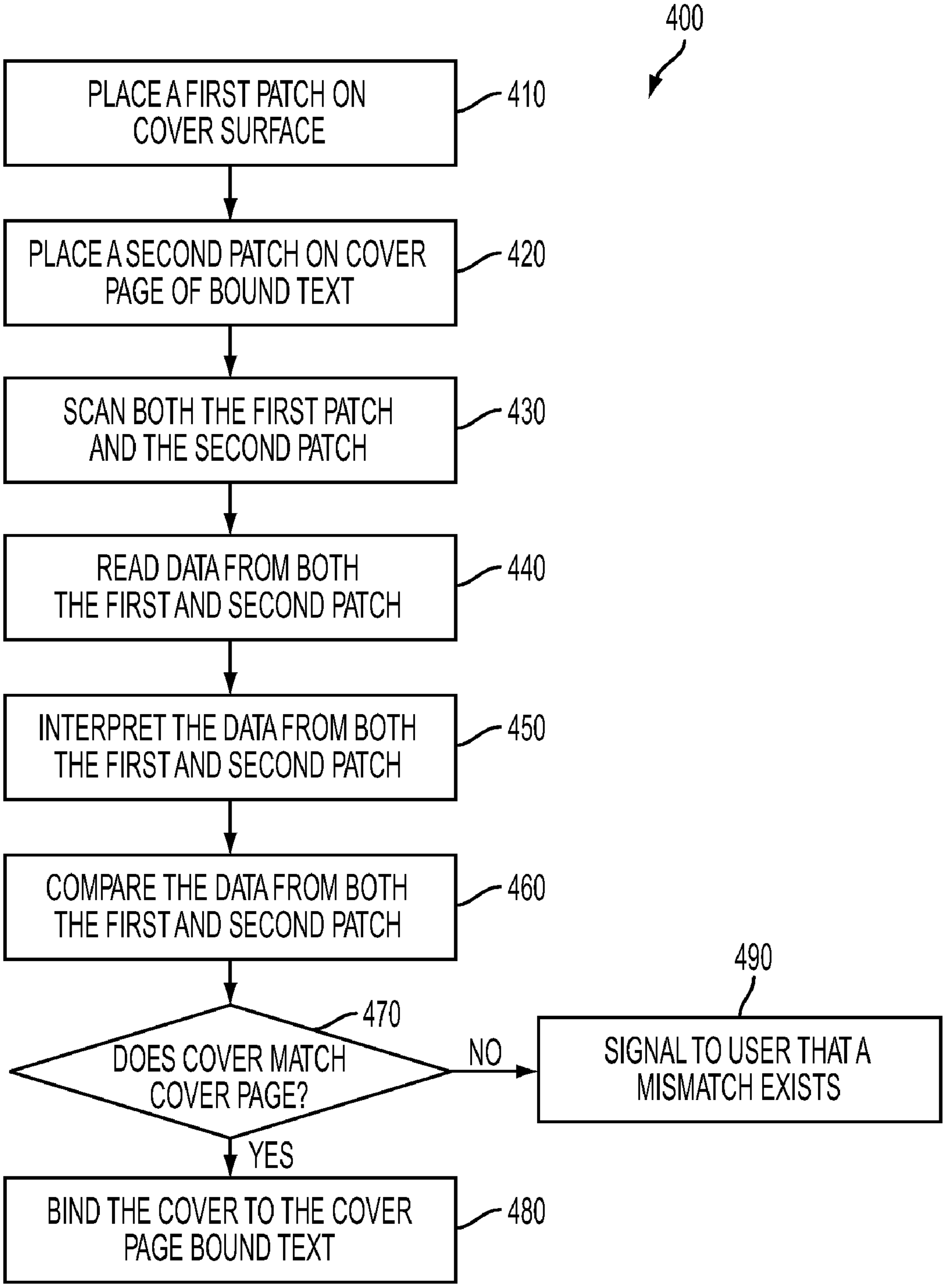
FIG. 4 is a flowchart illustrating the method of affixing, reading, and comparing patches.

With respect to FIG. 4, the present application illustrates a flow chart for the method of using the present application in the process of managing a binding process. The process 400 involves placing a patch on a cover surface 410 and placing a second patch on a cover sheet of a printed material 420. A light emitting device is used to scan the cover and cover page 430 and detect the patches. The detected patch is read 440 and the read data is interpreted 450. The data from both patches is compared 460. If the patches match 470, then the binding of the cover to the cover page printed matter occurs 480, but if the patches do not match, there is a signal to a user that there exists a mismatch 490 using a means such as, but not limited to, a computer display terminal, video display, a paper printout, a warning light, a bell, a buzzer or any other sound replication device, or any other means to draw the attention of a person by appealing to the taste, tough, hearing, sight, or smell senses.

Figure 5:
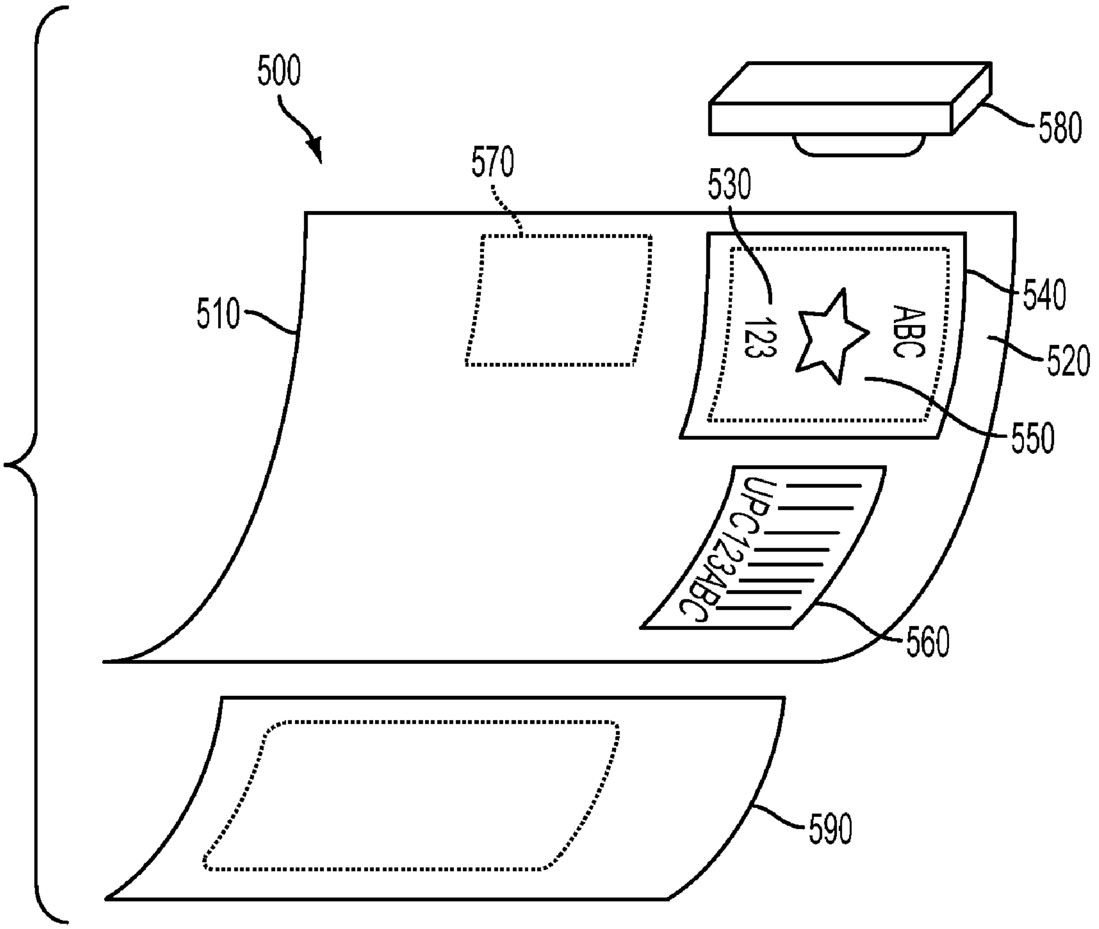
FIG. 5 illustrates the patch and the various types of printed matter printed in substantially invisible ink or clear toner and the symbology the patch may contain.

FIG. 5 illustrates the various figures and character that may be included on the patch 500. The paper 510 which may be printed with a special patch 520 is composed of a yellow low area coverage marks or with clear toner. Such a mark may be composed of a number 530, lettering 540, a symbol 550 such as, but not limited to, a geographical shape, a logo, a trademark, a drawing, or a universal product code (UPC) 560, a photograph 570, or any other type of mark comprised of any conceivable symbol or writing that might convey a meaning to a person or device that was made aware of such a mark, or any such combination of these elements. The patch may also take up 60% to 80% of the page 590 or the entire page. The ink or toner used to affix the mark will be so faint that the mark and the communication contained therein will be essentially invisible as not visible to the unaided human eye. A scanner viewer 580 will be necessary to find or detect such a mark. The scanner viewer will be necessary to read the detected mark. Once the mark is read, a device such as, but not limited to, a computer may be necessary in order to interpret a derived meaning from the uncovered mark. This will be a necessary condition for operation if the mark is a symbol not readily interpretable to an unaided person, such as a UPC code.

The present application uses coded invisible yellow patches to code the information. The patches will be a digital count of around 10 (<4%). An embedded inline spectrophotometer (e.g., Xerox ILS) is proposed to measure the invisible patches to track and manage the complete finished job electronically. The Xerox inline spectrophotometer has capabilities to distinguish yellow patches that were invisible to human eye. The present application offers a spectrophotometric solution for job integrity and output management applications with symbology printed using clear toner.

The patches consist of a symbology, which is defined in the art as the use of symbol with a cultural significance or context to convey a message. Examples would be a barber shop pole, or a pedestrian crossing sign, while an example of a modern symbology would be the universal product bar code. A spectrophotometric device is a scanner which uses light to detect the presence or absence of a symbology, read the symbology, and interpret the meaning of the symbology through interface with a computer operable medium to determine a meaning of the symbology.

FIG. 6 illustrates the correlation 600 between the patch number 610 and the area of coverage of a patch 620. A dynamic job integrity and verification system can be built using the proposed sensing system with invisible marks printed with clear toner to provide output job integrity solutions. Clear toner is invisible to the human eye, but is visible to the spectrophotometric sensor. The present application proposes to put an invisible symbology with clear toner on the cover of the book or specially designated job integrity sheet that customers want to track. We propose to print coded invisible clear toner patches to code the information. The patches will be a digital count of around 10 (60% to 80% area coverage). An embedded inline spectrophotometer is proposed to measure the invisible patches to track and manage the complete finished job electronically. Our initial measurements show that the Xerox inline spectrophotometer has capabilities to distinguish clear toner patches that are invisible to human eye.

In an enterprise-wide production shop due to the nature of distributed infrastructure, printing process requires efficient management of printed outputs. All aspects of output management solution should be able to handle the process from a digital document from the point of creation to the point of delivery. For example, while printing books cover pages are often printed on a different/same printer at different time. They are sent to the finishing modules/stations for automatic binding with text pages. Often there is mismatch between the cover page and the text pages of the book. This can lead to loss of job integrity and hence increases waste. We propose an inline spectrophotometer based solution which used an invisible symbology on the cover of the book or specially designated job integrity sheet that customers want to track. We propose to print coded invisible yellow patches in a four color press such as, but not limited to, iGen3 engine, to code the information. The yellow patches selected are of a digital count of around 10 (<4%). An embedded inline spectrophotometer such as, but not limited to Xerox inline spectrophotometer, is proposed to measure the invisible yellow patches to track and manage the completely finished job electronically.

When a six color press becomes available, clear toner may be used as one of the separations. Although the clear toner is invisible to the human eye, sensitive spectrophotometers can measure the color difference between the media with clear toner patch.

This disclosure relates to extending the functionality of the ILS system for job integrity management function with invisible encoding information printed with clear toner. It refers to producing a pattern, such as patches, on a cover sheet such as book/magazine cover sheet or a job banner sheet, to track the job with spectrophotometric sensors. The present application proposes to put invisible characters on the cover page of the book/job that customers want to track as finished product. We propose to print coded invisible patches with clear toner with a digital count around 60% to 80% area coverage and use the inline/offline spectrophotometers to measure those invisible patches for further use in inline/offline finishing stations.

Figure 7:
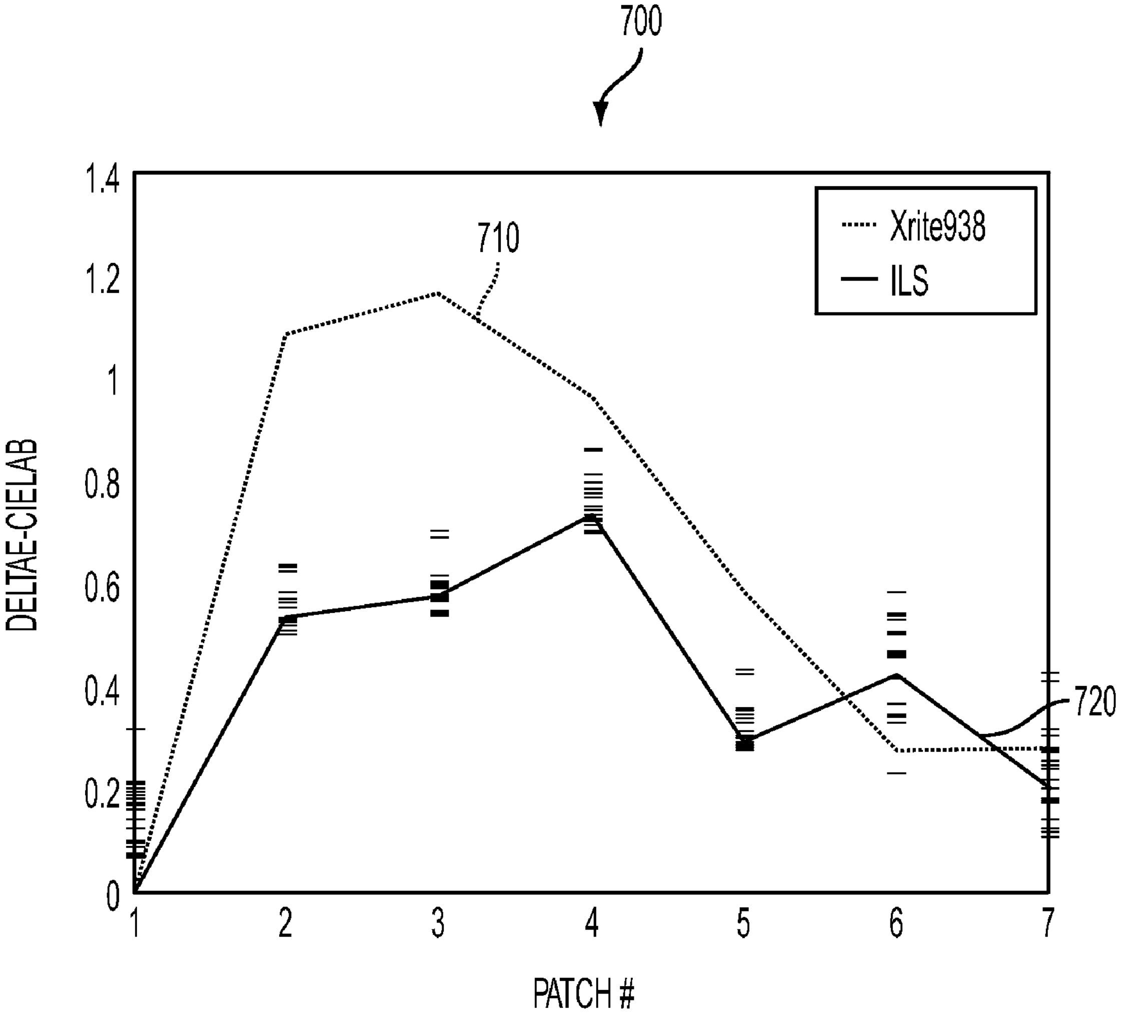
FIG. 7 is a graph showing performance of patch with respect to color.

FIG. 7 illustrates that the Xerox inline spectrophotometer has capabilities to distinguish clear toner patches that are invisible to the human eye 700. The X-axis refers to the patch size and the Y-axis refers to DeltaE, which is Delta-E (dE), a single number that represents the 'distance' between two colors. The idea is that a dE of 1.0 is the smallest color difference the human eye can see. So any dE less than 1.0 is imperceptible (as in "turn the lights off and head to the pub") and it stands to reason that any dE greater than 1.0 is noticeable (as in "put the coffee on, we're going to be here a while"). Unfortunately—and probably not surprisingly—it is not that simple. Some color differences greater than 1 are perfectly acceptable, maybe even unnoticeable. Also, the same dE color difference between two yellows and two blues may not look like the same difference to the eye and there are other places where it can fall down. Delta-E numbers can be used for determining how far off is a print or proof from the original; how much has a device drifted; how effective is a particular profile for printing or proofing; or removing subjectivity.

The curve line 710 shows color difference in CIELab space with respect to media white for six different patches created with clear toner at different area coverages. The curve line 720 is shown for Xerox inline spectrophotometer sensor. Points with '+' represent 20 measurements for each patch. Clearly for patches between 60% to 100% area coverage, the deltaE signal is sufficient to distinguish between the no toner to toner patch. This information will be used to read the invisible symbology.

It will be appreciated that an additional embodiment of the present application would be to allow a surface such as a cover or a cover page to contain more than one patch and that a match among a plurality of patches might be required in order to perform a binding.

It will be appreciated that an additional embodiment of the present application would be to allow patches to be attached to more than a single cover and a single cover page. A single cover could be matched to a plurality of cover pages and a plurality of bound pages such that the resultant job would contain a single cover bound to a plurality of cover page bound sections.

It will be appreciated that an additional embodiment of the present application would be to allow multiple covers to be matched and bound to a single cover page bound pages or to allow multiple covers to be matched and bound to multiple cover page bound pages. Such bindings occur frequently in the magazine industry when special edition covers or advertisements are attached over the regular cover.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An apparatus to facilitate matching a cover of a publication with a set of bound pages attached to a cover sheet comprising:
- a first substantially invisible clear toner patch containing a symbology;
- means to affix the first instance of the patch to a cover of a book;
- a second substantially invisible clear toner patch containing a symbology matching the symbology of the first patch:
- means to affix the second instance of the patch to the cover page of a set of unbound pages;
- at least one reader for reading the symbology of the plurality of patches, wherein the patch reader is a spectrophotometer;
- means for comparing the cover patch with the cover page patch;
- means to bind the cover to the cover page set of unbound pages; and
- signaling means to indicate that a match between cover symbology and cover sheet symbology has occurred or has not occurred.

2. The apparatus of claim 1, wherein the cover and set of bound pages comprise one of a book, a magazine, or a pamphlet.

3. The apparatus of claim 1, wherein means for comparing and interpreting the patch symbology is a computer, using a computer operable database.

4. The apparatus of claim 1, wherein the symbology comprises at least one of a letter, number, photograph, text, message, logo, trademark, or any combination thereof.

5. The apparatus of claim 1, wherein the patch covers 60% to 80% of the page it is placed upon.

6. A method of maintaining job integrity comprising the steps of:
- placing a substantially invisible patch on a cover surface, the patch comprising at least one of a clear toner patch and a yellow patch having a digital count below a predetermined value;
- placing a substantially invisible patch on a cover page set of unbound pages, the patch comprising at least one of a clear toner patch and a yellow patch having a digital count below the predetermined value;
- scanning the patch with a scanning device to detect the patch from the cover surface and the cover page attached to a set of unbound pages;
- reading the detected patches, wherein the patch reader is a spectrophotometer;
- interpreting the information contained in the patches;
- comparing the information on the patches;
- if the patches match, binding the cover to the cover page printed matter; and
- if the patches do not match, signal to a user that a mismatch exists.

7. The apparatus of claim 6, wherein the cover and set of bound pages comprise one of a book, a magazine, or a pamphlet.

8. The apparatus of claim 6, wherein means for comparing and indicating a symbology is a computer, using a computer operable database.

9. The method of claim 6, wherein the symbology comprises at least one of a letter, number, photograph, text, message, logo, trademark, or any combination thereof.

10. The apparatus of claim 6, wherein the patch covers 60% to 80% of an area of the page it is placed upon.

11. A system for using a patch containing a symbology for maintaining job integrity comprising:
- a least one substantially invisible patch placed on a cover surface, the patch comprising at least one of a clear toner patch and a yellow patch having a digital count below a predetermined value;
- at least one substantially invisible patch placed on a cover page set of unbound pages, the patch comprising at least one of a clear toner patch and a yellow patch having a digital count below the predetermined value;
- at least one process component for scanning the at least one patch with a scanner to detect the patch from a covering surface and a patch attached to a cover sheet;
- at least one peripheral device for reading the detected patch, wherein the device is a spectrophotometer;
- at least one process component for interpreting the information contained in the patches;
- at least one process component for comparing the information on the patches;
- at least one process component for performing the binding of the cover to the cover page printed matter if the patches match; and
- at least one process component for signaling to the user if the patches do not match.

12. The system of claim 11, wherein the cover and set of bound pages comprise one of a book, a magazine, or a pamphlet.

13. The system of claim 11, wherein means for comparing and indicating a symbology is a computer, using a computer operable database.

14. The system of claim 11, wherein the symbology comprises at least one of a letter, number, photograph, text, message, logo, trademark, or any combination thereof.

15. The system of claim 11, wherein the patch covers 60% to 80% of an area of the page it is placed upon.

16. A method for maintaining job integrity comprising:
- placing a substantially invisible patch on a first part of the job, the patch comprising at least one of a clear toner patch and a yellow patch having a digital count below a predetermined value;
- placing a substantially invisible second patch on a second part of the job, the second patch comprising at least one of a clear toner patch and a yellow patch having a digital count below the predetermined value;
- comparing the patch on the first part of the job with the patch on the second part of the job, wherein the patches are read with a spectrophotometer;
- if the first patch and the second patch match, then combine the first and second part of the job; and
- if the first patch and the second patch do not match, then indicating that the patches are a mismatch.

17. A method of maintaining job integrity comprising the steps of:
- placing at least one substantially invisible patch on a first part of a job, the patch comprising at least one of a clear toner patch and a yellow patch having a digital count below a predetermined value;
- placing any additional number of substantially invisible patches on any additional number of parts of the same job, the patches comprising at least one of a clear toner patch and a yellow patch having a digital count below the predetermined value;

detecting the plurality of substantially invisible patches with a scanner;

reading the plurality of detected patches, wherein the patch reader is a spectrophotometer;

interpreting the information contained in the plurality of patches;

comparing the information on the plurality of read patches;

if the plurality of patches indicate that the attached parts of the job match, then combine the individual parts of the job together; and if at least one of the patches do not match the plurality of patches, signal to a user that there exists a mismatch within the plurality of patches.

* * * * *